United States Patent
Jeung et al.

(10) Patent No.: US 8,805,338 B2
(45) Date of Patent: Aug. 12, 2014

(54) METHOD AND SYSTEM FOR MANAGING COMMUNICATION OF A DUAL-STANDBY PORTABLE TERMINAL

(75) Inventors: Ki-Suk Jeung, Seongnam-si (KR); Joung-Kyou Park, Seoul (KR); Hyung-Min Rho, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 212 days.

(21) Appl. No.: 13/227,346

(22) Filed: Sep. 7, 2011

(65) Prior Publication Data

US 2012/0058748 A1 Mar. 8, 2012

(30) Foreign Application Priority Data

Sep. 7, 2010 (KR) ........................ 10-2010-0087652

(51) Int. Cl.
*H04M 3/42* (2006.01)

(52) U.S. Cl.
USPC ................... 455/414.1; 455/435.1; 455/435.2

(58) Field of Classification Search
USPC ................. 455/414.1, 435.1, 435.2
See application file for complete search history.

(56) References Cited

U.S. PATENT DOCUMENTS

| | | | |
|---|---|---|---|
| 2006/0084440 A1* | 4/2006 | Bakri | 455/439 |
| 2008/0096504 A1* | 4/2008 | Linkola et al. | 455/187.1 |

\* cited by examiner

*Primary Examiner* — Wayne Cai

(57) ABSTRACT

A method and system for managing communication of a dual-standby portable terminal are provided, in which upon generation of communication traffic with a first communication network among a plurality of communication networks, the portable terminal transmits a hold signal to a second communication network for which communication traffic has not been generated, other than the first communication network, and upon receipt of the hold signal, the second communication network restricts a communication connection to the portable terminal.

20 Claims, 3 Drawing Sheets

METHOD AND SYSTEM FOR MANAGING COMMUNICATION OF A DUAL-STANDBY PORTABLE TERMINAL

CROSS-REFERENCE TO RELATED APPLICATION(S) AND CLAIM OF PRIORITY

The present application is related to and claims priority under 35 U.S.C. §119(a) to a Korean Patent Application filed in the Korean Intellectual Property Office on Sep. 7, 2010 and assigned Serial No. 10-2010-0087652, the contents of which are incorporated herein by reference.

TECHNICAL FIELD OF THE INVENTION

The present invention relates to a portable terminal, and more particularly, to a method and system for managing communication of a portable terminal.

BACKGROUND OF THE INVENTION

At present, Global System for Mobile communications (GSM) and Code Division Multiple Access (CDMA) are major communication technologies for portable terminals. Most of Europe uses GSM, whereas CDMA is the most dominant standard in the U.S. Modifications of GSM and CDMA are also used. In some areas, a plurality of communication technologies is used jointly or in combination, for portable terminals. Recent portable terminals support dual modes so that a plurality of communication networks can be used with a single portable terminal.

A dual-mode portable terminal cannot use a communication network until the dual-mode portable terminal is completely booted to the communication network, taking much time. Therefore, the selective use of a communication network causes inconvenience to a dual-mode portable terminal user. For example, a dual-mode portable terminal supporting CDMA and GSM communication networks needs to be booted in CDMA mode, for using the CDMA communication network. For using the GSM network later, the dual-mode portable terminal should be switched to GSM mode through rebooting. As much time is taken for rebooting, the dual-mode portable terminal is not so convenient to the user.

To overcome the inconvenience caused by the dual-mode portable terminal, a dual-standby portable terminal was proposed. Unlike the dual-mode portable terminal that is booted to a single communication network, the dual-standby portable terminal simultaneously supports a plurality of communication networks (e.g. CDMA and GSM communication networks).

Such a dual-standby portable terminal has limitations in actual calls. Since common parts such as a microphone and a speaker used for outputting voice during a voice call or ringtones and bell sound during data communication cannot be used simultaneously, if the common parts are in use in one communication mode, a possible communication request of another communication mode cannot be notified to a user.

For example, even though a communication request (e.g. a voice call request) is generated from the GSM communication network during a voice call over the CDMA communication network, it is difficult to notify the user of the communication request from the GSM communication network because the common hardware like the microphone and the speaker are in use for the on-going voice call.

SUMMARY OF THE INVENTION

To address the above-discussed deficiencies of the prior art, it is a primary object to provide at least the advantages described below.

Accordingly, an aspect of embodiments of the present disclosure is to provide a method and system for managing communication of a dual-standby portable terminal so that a user can easily identify a communication request which has been generated from one communication network during communication over another communication network.

In accordance with an embodiment of the present disclosure, there is provided a system for managing communication of a dual-standby portable terminal, in which upon generation of communication traffic with a first communication network among a plurality of communication networks, the portable terminal transmits a hold signal to a second communication network for which communication traffic has not been generated, other than the first communication network, and upon receipt of the hold signal, the second communication network restricts a communication connection to the portable terminal.

In accordance with another embodiment of the present disclosure, there is provided a method for managing communication of a dual-standby portable terminal, in which upon generation of communication traffic with a first communication network among a plurality of communication networks, a hold signal is transmitted to a second communication network for which communication traffic has not been generated, other than the first communication network by the portable terminal, and upon receipt of the hold signal, a communication connection to the portable terminal is restricted by the second communication network.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
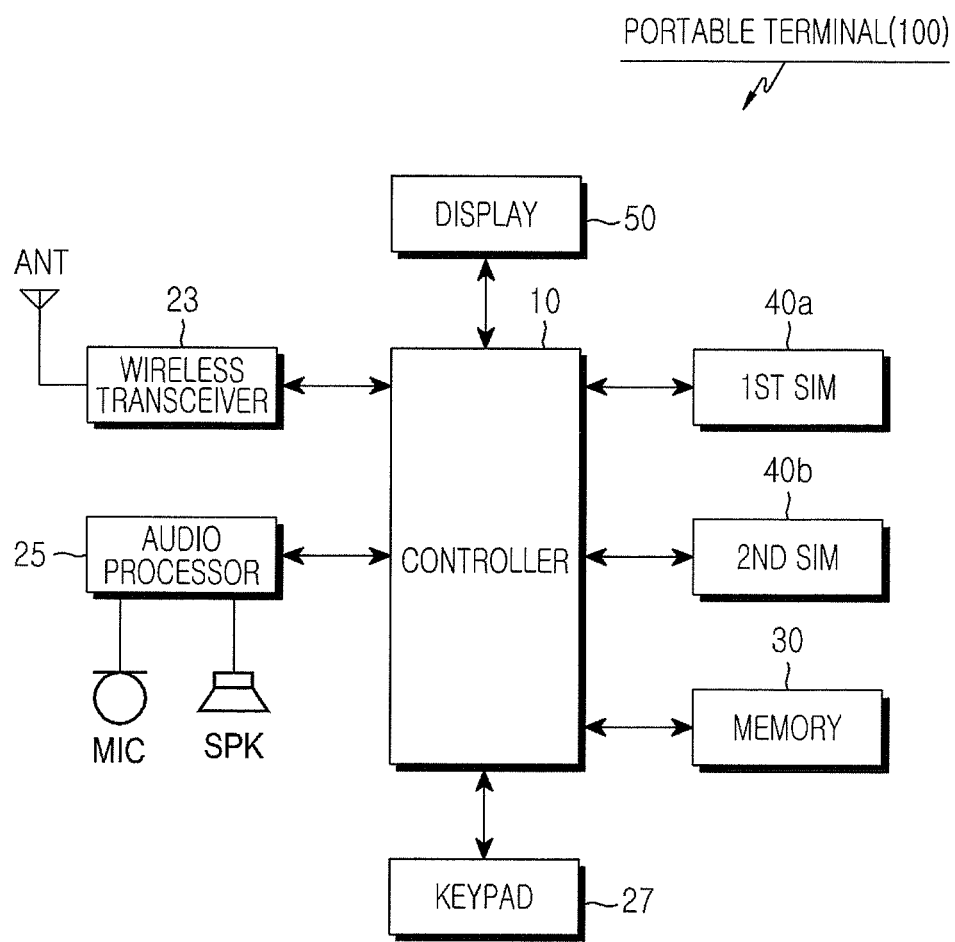
FIG. 1 illustrates a block diagram of a portable terminal according to the present disclosure.
Figure 2:
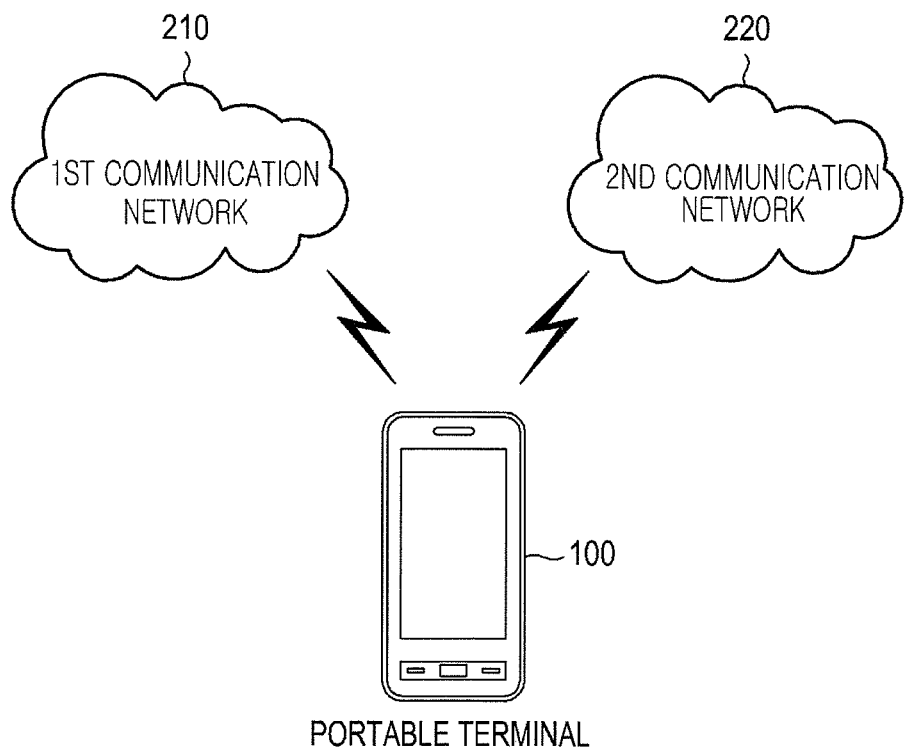
FIG. 2 illustrates connections between the portable terminal and a plurality of communication networks according to the present disclosure.
Figure 3:
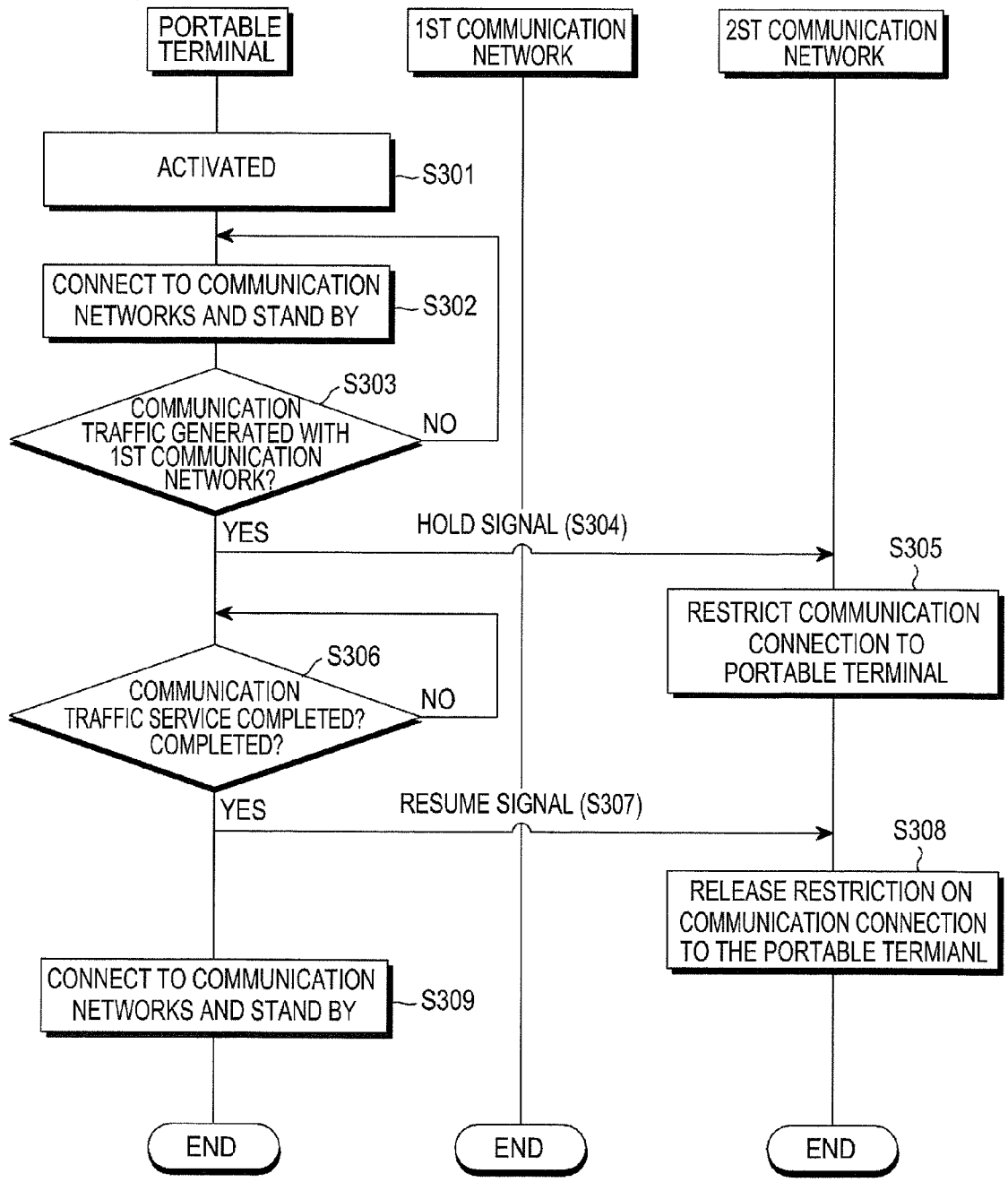
FIG. 3 illustrates an operation for managing communication of the portable terminal according to the present disclosure.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communications network. A detailed description of a generally known function and structure of the present invention will be avoided lest it should obscure the subject matter of the present invention. The terms described below are defined in connection with the function of the present invention. The meaning of the terms may vary according to the user, the intention of the operator, usual practice, etc. Therefore, the terms should be defined based on the description rather than the specification.

FIG. 1 illustrates a block diagram of a portable terminal 100 according to the present disclosure. While the portable terminal 100 is shown in FIG. 1 as not having components such as a Global Positioning System (GPS) module, a camera module, a Bluetooth module, a Wireless Fidelity (Wi-Fi) module, an acceleration sensor, a proximity sensor, a geomagnetic sensor, and a Digital Multimedia Broadcasting (DMB) receiver, it is clearly understood to those skilled in the art that these components may be included in the portable terminal and provide their own functions.

In accordance with the present disclosure, the portable terminal 100 is a mobile electronic device. The term "portable terminal" covers a broad range of terminals including a video phone, a mobile phone, a smart phone, an International Mobile Telecommunications (IMT)-2000 terminal, a Wideband Code Division Multiple Access (WCDMA) terminal, a Personal Digital Assistant (PDA), a Portable Multimedia Player (PMP), a DMB terminal, a Personal Computer (PC) like a desktop computer and a laptop computer, etc.

In this illustrative example, the portable terminal 100 is a multi-Subscriber Identity Module (SIM) terminal and thus supports a plurality of (e.g. two or more) communication modes. Therefore, the portable terminal 100 may include two or more SIM cards including first and second SIM cards 40*a* and 40*b*. These SIM cards 40*a* and 40*b* may be inserted into or removed (detached) from the portable terminal 100 through SIM card sockets (not shown).

The first and second SIM cards 40*a* and 40*b* are dual-standby mode smart cards for connecting the portable terminal 100 to a plurality of communication networks. If the plurality of communication networks are Global System for Mobile communications (GSM) and Code Division Multiple Access (CDMA) communication networks, the first and second SIM cards 40*a* and 40*b* may contain wireless communication-related records as well as subscriber information and authentication information for GSM communication and CDMA communication. Therefore, the first and second SIM cards 40*a* and 40*b* may support two different CDMA modes, two different GSM modes, or one CDMA mode and one GSM mode. A plurality of communication modes supported by the first and second SIM cards 40*a* and 40*b* may include CDMA, GSM, Wideband CDMA (WCDMA), Wireless Broadband (WiBro), etc.

Data of the first and second SIM cards 40*a* and 40*b* is managed by a file system built with a Master File (MF), Dedicated Files (DFs), and Elementary Files (EFs). The MF is a root file of the file system. The DFs are sub-directories of the MF, supporting functions required for telecommunication services, GSM operations, and CDMA operations. A DF has a plurality of EFs in which data used for each service is stored. An EF generically refers to any file required for execution of an application file of each DF. Subscriber information such as subscriber phone numbers, billing details, and frequently used phone numbers, and security-related authentication information are stored in the EFs.

A wireless transceiver 23 includes a Radio Frequency (RF) unit and a MODEM. The RF unit includes an RF transmitter for upconverting the frequency of a transmission signal and amplifying the upconverted signal and an RF receiver for low-noise-amplifying a received signal and downconverting the frequency of the low-noise-amplified signal. The MODEM includes a transmitter for encoding and modulating the transmission signal and a receiver for demodulating and decoding the signal received from the RF unit. According to the embodiment of the present disclosure, it is assumed that the wireless transceiver 23 supports all of heterogeneous communication networks such as CDMA and GSM communication networks. When needed, the wireless transceiver 23 may have a plurality of antennas ANT to support CDMA and GSM communications.

An audio processor 25 may include a Coder-Decoder (CODEC). The CODEC includes a data CODEC and an audio CODEC. The data CODEC processes packet data and the audio CODEC processes an audio signal such as voice and a multimedia file. The audio processor 25 reproduces an audio signal by converting a digital audio signal received from the MODEM to an analog signal through the audio CODEC, or converts an analog audio signal generated from a microphone to a digital audio signal through the audio CODEC and transmits the digital audio signal to the MODEM. The CODEC may be configured separately or incorporated into a controller 10.

A keypad 27 may include alphanumerical keys for entering digits and characters, function keys for setting functions, and a touch pad. If a display 50 is configured into a capacitive or resistive touch screen, the keypad 27 may be omitted or include a minimum number of keys. In this example, the display 50 may take charge of a part of key input functions.

A memory 30 may include a program memory and data memories. The program memory stores programs for controlling regular operations of the portable terminal 100. The memory 30 may include an external memory such as a Compact Flash (CF) memory card, a Secure Digital (SD) card, a micro-SD memory card, a mini-SD memory card, an extreme Digital (XD) card, and a memory stick.

The display 50 displays various types of information generated in the portable terminal 100. The display 50 may be various types of displays such as a Liquid Crystal Display (LCD), an Organic Light Emitting Diode (OLED) display (e.g. a Passive Matrix OLED (PMOLED) or Active Matrix OLED (AMOLED) display), etc. The display 50 may also include a touch screen that can be used not only as an output device but also as an input device along with the keypad 27.

The controller 10 provides overall control to the portable terminal 100. The controller 10 may switch one operation of the portable terminal 100 to another operation according to a user input received through the keypad 27 or the display 50 and control the operations of the portable terminal 100. In accordance with the present disclosure, the controller 10 senses insertion of SIM cards (e.g. the first and second SIM cards 40*a* and 40*b*) into the card sockets (not shown), initializes the portable terminal 100 through the SIM cards, connects the portable terminal 100 to at least one communication network, and then is placed in standby mode. The operation of the controller 10 according to the embodiment of the present disclosure will be described later in greater detail.

FIG. 2 illustrates connections between the portable terminal and a plurality of communication networks according to the present disclosure.

Referring to FIG. 2, the portable terminal 100 simultaneously connects to two communication networks (e.g. first and second communication networks 210 and 220) through the first and second SIM cards 40a and 40b and then is placed in the standby mode. Thus, the portable terminal 100 provides a dual-standby function.

Because the portable terminal 100 is assumed to be a dual-SIM card terminal in an embodiment of the present disclosure, portable terminal 100 is shown in FIG. 2 as connected to the plurality of communication networks, that is, the first and second communication networks 210 and 220. However, if the portable terminal 100 is a triple- or quadruple-SIM card terminal, portable terminal 100 may be simultaneously connected to three or more communication networks.

Each of the first and second communication networks 210 and 220 may be one of CDMA, GSM, WCDMA, and WiBro wireless communication networks.

FIG. 3 illustrates an operation for managing communication of the portable terminal according to the present disclosure. With reference to FIGS. 1, 2 and 3, an embodiment of the present disclosure will be described below.

In steps S301 and S302, after the portable terminal 100 is activated, portable terminal 100 is connected to communication networks through the inserted first and second SIM cards 40a and 40b and kept in standby mode.

Specifically, the portable terminal 100 is initialized using the inserted first and second SIM cards 40a and 40b, establishes communication connections with communication networks corresponding to the SIM cards 40a and 40b, and then is placed in the standby mode.

In this illustrative example, it is assumed that the communication network connected in correspondence with the first SIM card 40a is the first communication network 210 being a CDMA communication network and the communication network connected in correspondence with the second SIM card 40b is the second communication network 220 being a GSM communication network. Thus, the portable terminal 100 provides a dual-standby function by simultaneously connecting to the CDMA and GSM communication networks and then entering into the standby mode.

Upon generation of communication traffic with the first communication network 210, the portable terminal 100 transmits a hold signal to the second communication network 220 in steps S303 and S304.

According to the embodiment of the present disclosure, generation of communication traffic amounts to generation of a voice call or data communication. In this example, a communication channel of the portable terminal switches from an access channel to a traffic channel. A voice call is a major function of portable terminals. Internet browsing through an Internet browser and real-time streaming and reproduction of multimedia using a specific application are major examples of data communication.

In step S305, after receiving the hold signal from the portable terminal 100, the second communication network 220 restricts a communication connection to the portable terminal 100.

Even though the other communication party requests a voice call to the portable terminal through the second communication network 220, the portable terminal 100 cannot respond to the voice call requested through the second communication network 220, if the portable terminal 100 is conducting a voice call over the first communication network 210.

Therefore, upon receipt of the hold signal from the portable terminal 100, the second communication network 220 (e.g. a server in the second communication network 220) restricts a communication connection that is to be established with the portable terminal 100 through the second communication network 220, determining that the portable terminal 100 is communicating with another communication network (e.g. the first communication network 210).

In this illustrative example, restriction of a communication connection means that even though a communication connection to the portable terminal 100 that has transmitted a hold signal is requested through the second communication network 220, the requesting communication party is notified by, for example, a message that the communication connection is not available due to generation of communication traffic (e.g. a voice call) at the portable terminal 100 through the first communication network 210 and thus the communication connection request to the portable terminal 100 is canceled.

That is, restriction of a communication connection means that when a communication connection to the portable terminal 100 is requested, the requesting communication party is notified of the communication as unavailable and at the same time, a communication connection service of the portable terminal 100 is not provided to the requesting communication party.

In steps S306 and S307, the portable terminal 100 determines whether the communication traffic generated in step S303 has been completely serviced, and upon completion of servicing the communication traffic, transmits a resume signal to the second communication network 220.

The controller 10 of the portable terminal 100 periodically monitors completion of servicing the communication traffic (e.g. a voice call or data communication) generated in step S303. Upon completion of serving the communication traffic, the controller 10 transmits a resume signal to the second communication network 220. For example, the controller 10 may determine that the communication traffic has been completely serviced, when an on-going voice call ends.

In step S308, after receiving the resume signal, the second communication network 220 releases restriction of a communication connection to the portable terminal 100. Then the portable terminal 100 connects to each communication network (e.g. the first and second communication networks 210 and 220) and then stands by in step S309.

When receiving the resume signal from the portable terminal 100 that transmitted the hold signal, the server of the second communication network 220 confirms that the portable terminal 100 has transitioned to a communication connection available state.

Therefore, the server of the second communication network 220 releases the restriction imposed on a communication connection to the portable terminal 100 in step S305.

In this illustrative example, the resume signal may be regarded as a signal that releases restriction of a communication connection to the portable terminal. As the resume signal is issued, the second communication network 220 and the portable terminal 100 returns to the state before the hold signal is issued.

Therefore, after receiving the resume signal, the second communication network 220 is maintained in the connected state with respect to the portable terminal 100, as is done before the hold signal is received. Upon request of a communication connection to the portable terminal 100, the second communication network 220 connects the requesting communication party to the portable terminal 100. The portable terminal 100 also stands by in the connected state with respect to the first and second communication networks 210 and 220 as is done before the hold signal is transmitted, and operates as a dual-standby portable terminal.

Meanwhile, some embodiments of the present disclosure may be modified such that the second communication network 220 stores information (e.g. a connection request list) about requests for communication connection to the portable terminal 100 which are generated after restriction is imposed on communication connection to the portable terminal 100, and then transmits the information to the portable terminal 100, upon receipt of a resume signal.

For instance, upon receipt of the resume signal, the second communication network 220 may transmit a list of connection requested times and information about requesting communication parties (e.g. identification information such as names, phone numbers, and IDs) to the portable terminal 100. Thus, the user of the portable terminal 100 may read the list of communication connection requests (e.g. voice call requests) generated from the second communication network 220 during a voice call over the first communication network 210 and then may conduct communication with a connection-requesting party.

While it is assumed that communication traffic is generated for the portable terminal 100 from the first communication network 210 in the above embodiment of the present disclosure described with reference to FIG. 3, the present disclosure is not limited to the specific communication network.

That is, in the illustrative embodiment illustrated in FIG. 3, a communication network that generates communication traffic with respect to the portable terminal 100 is identified between the first and second communication networks 210 and 220. Then a hold signal is transmitted to the other communication network (and other portable terminals connected to the other communication network) which has not generated communication traffic, in order to indicate that a communication connection to the portable terminal 100 is now unavailable. If the portable terminal 100 transmits a resume signal to the other communication network, release from the connection-unavailable state is notified.

As is apparent from the above description of the present disclosure, even though a dual-standby portable terminal supporting a plurality of communication networks is conducting communication with one communication network, a user can check later a list of communication connection requests to the portable terminal generated through the other communication networks and related information.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A system for managing communication of a dual-standby portable terminal, the system comprising:
the portable terminal configured to, upon generation of a voice call or a data communication session with a first communication network among a plurality of communication networks, transmit a hold signal to a second communication network for which no voice call or data communication session is occurring with the portable terminal, other than the first communication network; and
the second communication network configured to, upon receipt of the hold signal, restrict a communication connection to the portable terminal.

2. The system of claim 1, wherein at a time of the generation of the call or a data communication session with the first communication network, the portable terminal is connected in a standby mode with the second communication network.

3. The system of claim 1, wherein the second communication network is further configured to notify, responsive to receiving a request for a communication connection to the portable terminal from a communication party after receiving the hold signal, the communication party that the communication connection to the portable terminal is unavailable.

4. The system of claim 3, wherein the second communication network is further configured to store information about the request for a communication connection to the portable terminal, the information generated after receiving the hold signal.

5. The system of claim 1, wherein the portable terminal is further configured to transmit, responsive to completion of the voice call or the data communication session, a resume signal to the second communication network.

6. The system of claim 5, wherein the second communication network is further configured to release, responsive to receiving the resume signal, the restriction on a communication connection to the portable terminal.

7. The system of claim 6, wherein the second communication network is further configured to transmit information about a request for a communication connection to the portable terminal, the information generated after receiving the hold signal, to the portable terminal after receiving the resume signal.

8. A method for managing communication of a dual-standby portable terminal, the method comprising:
receiving, upon generation of a voice call or a data communication session between the portable terminal and a first communication network among a plurality of communication networks, a hold signal from the portable terminal by a second communication network for which no voice call or data communication session is occurring with the portable terminal, other than the first communication network; and
restricting, upon receipt of the hold signal, a communication connection to the portable terminal by the second communication network.

9. The method of claim 8, wherein at a time of the generation of the call or a data communication session with the first communication network, the portable terminal is connected in a standby mode with the second communication network.

10. The method of claim 8 further comprising:
responsive to receiving a request for a communication connection to the portable terminal from a communication party after receiving the hold signal, notifying the communication party that the communication connection to the portable terminal is unavailable by the second communication network.

11. The method of claim 10 further comprising:
storing information about the request for a communication connection to the portable terminal, the information generated after receiving the hold signal, by the second communication network.

12. The method of claim 8 further comprising:
responsive to completion of the voice call or the data communication session, receiving a resume signal from the portable terminal by the second communication network.

13. The method of claim 12 further comprising:
responsive to receiving the resume signal, releasing the restriction on a communication connection to the portable terminal by the second communication network.

14. The method of claim 13 further comprising:

transmitting information about a request for a communication connection to the portable terminal, the information generated after receiving the hold signal, to the portable terminal by the second communication network, after receiving the resume signal.

15. A system for managing communication of a dual-standby portable terminal, the system comprising:

a second communication network configured to:

upon generation of a voice call or a data communication session between the portable terminal and a first communication network among a plurality of communication networks, receive a hold signal from the portable terminal, wherein the second communication network is a network for which no voice call or data communication session is occurring with the portable terminal; and upon receipt of the hold signal, restrict a communication connection to the portable terminal.

16. The system of claim 15, wherein at a time of the generation of the call or a data communication session with the first communication network, the portable terminal is connected in a standby mode with the second communication network.

17. The system of claim 15, wherein the second communication network is further configured to notify, responsive to receiving a request for a communication connection to the portable terminal from a communication party after receiving the hold signal, the communication party that the communication connection to the portable terminal is unavailable.

18. The system of claim 17, wherein the second communication network is further configured to store information about the request for a communication connection to the portable terminal, the information received after receiving the hold signal.

19. The system of claim 15, wherein the second communication network is further configured to receive, responsive to completion of the voice call or the data communication session, a resume signal from the portable terminal.

20. The system of claim 19, wherein the second communication network is further configured to release, responsive to receiving the resume signal, the restriction on a communication connection to the portable terminal.

* * * * *